UNITED STATES PATENT OFFICE.

JOHN H. NORTHROP, OF NEW YORK, N. Y., ASSIGNOR TO THE ROCKEFELLER INSTITUTE FOR MEDICAL RESEARCH, OF NEW YORK, N. Y., A CORPORATION OF NEW YORK.

PROCESS FOR THE PRODUCTION OF ACETONE.

1,293,172.  Specification of Letters Patent.  Patented Feb. 4, 1919.

No Drawing.   Application filed July 8, 1918. Serial No. 243,811.

*To all whom it may concern:*

Be it known that I, JOHN H. NORTHROP, a citizen of the United States, and a resident of the city of New York, borough of Manhattan, county and State of New York, have invented a new and Improved Process for the Production of Acetone, of which the following is a specification.

The process has for its object the production of acetone, and incidentally ethyl alcohol, from products containing starches, sugar and similar carbohydrates, such as corn, molasses, potatoes, horse-chestnuts, etc. In carrying out my process the starchy or sugary material is subjected to fermentation by the action of a certain bacillus acetoethylicum.

The bacillus-ethylicum was obtained from a sample of old potatoes. According to the description chart of the Society of American Bacteriologists, said bacillus is described as follows:

*Source.*—Old potatoes.
*Date of isolation.*—July, 1917.
*Name.*—Bacillus aceto-ethylicum.

I. *Morphology.*

1. Vegetative cells, motile:
   (a) Media used—agar slant, or 10% corn media (1 part corn in 10 parts water), temp. 40° C., age 24 hours.
       Form—short rods, no chains in agar slant. Occasional short chains in 10% corn media.
       Size—4–6μ.X0.2–0.3μ.
       Ends—rounded.
       Stain—evenly with Loeffler's methylene blue or gentian violet.
       Gram stain negative.
   (b) Media used—10% corn media, temp. 40° C., age 6–10 days.
       Form — short rods — occasional short chains.
       Size—4–6μ.X0.2–0.3μ.
       Ends—rounded.
       Stain—unevenly with Loeffler's methylene blue or gentian violet, with deep stain spot at end or in center. Gram stain negative.

2. Sporangia:
   Media used, glucose agar slant.
   Temperature—40° C., after 2 to 3 days spores formed.
   Form—elliptical. Spores form at end of rods.
   Limits of size—1μ.
   Size of majority—.6–.8μ.
   Spores stain easily with Loeffler's methylene blue.

II. *Cultural features.*

1. 2% glucose agar slant media, age 24 hours, temp. 40° C.
   Growth, moderate.
   Form of growth, spreading.
   Elevation of growth, effuse.
   Luster, dull.
   Optical character, translucent.
   Odor, absent.
   Media, clear.
   Condensation water, opaque.
2. Potato, 24 hours, 40° C.
   No visible growth on surface.
   Gas bubbles all over media, crumbles easily, no odor.
   After 2–3 days, 40° C.
   Media sinks to grayish white paste.
2ª. Glucose broth. After 24 hours, 40° C. (Media cloudy, no odor.)
   Slight gas bubbles.
   After 2–3 days, slimy mass in bottom of test tube.
4. Litmus milk, 24 hours, 40° C.
   Bottom of tube reduced to white, no gas, odor, acid, nor clot.
   36 hours, 40° C. Milk red on top, rest white.
   72 hours, 40° C. Same but coagulated; clot does not digest subsequently.
10. Agar colonies. 2 per cent. glucose agar, 24 hours, 40° C.
    Growth, slowly spreading.
    Round, sometimes irregular.
    Surface, smooth.
    Elevation, effuse.
    Edge entire or undulate.
    Internal structure, coarsely granular.

*II. Cultural features.—Cont'd.*

15. Sodium chlorid in bouillon.
    Inhibiting concentration is 4–5 per cent. sodium chlorid.
17. Nitrogen source. With sugar as carbohydrate may be obtained from peptone, proteins or ammonium salts. With starch. Same, but cannot use ammonium salts.
18. Best media for long continued growth. 2 per cent. corn media with $CaCo_3$.

*III. Physical and biochemical features.*

1. Fermentation tubes:
   See table of sugars fermented, *infra*.
7. Optimum reaction of media:
   For growth, Sorensen's $^PH$ values— 7.2 to 7.4.
   For fermentation, Sorensen's $^PH$ values—6.0 to 7.0.
8. Vitality on culture media:
   At least 6 months at room temperature.
   At least 3 months at 40° C.
9. Temperature relation:
   Optimum temperature 40° to 43° C.
   Spores may be boiled at least 20 minutes.
10. Resistant to drying.
13. Acids produced, formic.
15. Alcohol, ethyl.
    Ketones, acetone.

*IV. Pathogenicity.*

1. Non-pathogenic to mice.

In carrying out my process, a mash of the substance to be fermented is prepared, containing preferably 2 to 10 parts of carbohydrate material, 100 parts water, and about ½ to 1 part of some suitable nitrogenous material, such as protein, if sufficient is not already contained in the carbohydrate material used. This mash is then sterilized, preferably by heat, and is cooled to a temperature of from 35° to 45° C., and the reaction brought to a hydrogen ion concentration of 6.8 to 7.4 (Sorensen $^PH$ values) by means of some suitable soluble or insoluble buffer substance, such as calcium carbonate or sodium phosphate, which will prevent the mash from becoming acid. The mash is then put into a closed sterile vessel, preferably filled with some inert material, such as marble chips or brush, and inoculated with a culture of the bacillus aceto-ethylicum above described and allowed to ferment for from 4 to 8 days. At the end of that time some 8% to 13% of the dry weight of the carbohydrate has been converted into acetone, and about 18% to 26% of the dry weight of the carbohydrate has been converted into alcohol, principally ethyl alcohol. The fermented material treated is then removed from the vessel and the alcohol and acetone are recovered by any well known method, such as distillation. A fresh supply of mash prepared in the same way may be put into the vessel and is caused to ferment by the bacilli adhering to the walls of the vessel and the inert material after the withdrawal of the first batch of fermented material. The second and succeeding fermentations are somewhat more rapid than the first one, the second and succeeding operations being completed in from 40 to 60 hours.

The amount of alcohol and acetone which is produced by the above process varies with the kinds of carbohydrate material employed. The following table, which was prepared from laboratory experiments conducted by using the materials named in a 1% solution with the addition of a suitable amount of calcium carbonate as a buffer substance and of peptone as a nitrogen source, illustrates the relative yield of acetone and alcohol obtained from the various substances named. Except as otherwise specified, the percentages refer to the dry weight of the substance used.

*Table of sugars fermented.*

| Substance. | Per cent. acetone. | Per cent. alcohol. |
|---|---|---|
| Galactose*** | 4– 5 | 22–24 |
| Maltose | 6– 7 | 23–24 |
| Mannose | 6– 7 | 22–23 |
| Raffinose | 8–10 | 22–23 |
| d-Arabinose |  | 22–23 |
| Ca-lactate | 6– 7 | 12–16 |
| Starch | 8–10 | 20–24 |
| Beet molasses | *8–10 | *16–24 |
| Potatoes, white or sweet | **2– 4 | **4– 9 |
| Dextrin |  |  |
| Dextrose | 6– 7 | 14–16 |
| Levulose*** | 9–10 | 22–23 |
| Xylose | 8–10 | 24–25 |
| Glycerin | 4– 5 | 18–20 |
|  |  | 40–43 |
| Sucrose | 8– 9 | 24–26 |
| Corn | 10–13 | 20–26 |
| Corn cobs | 1– 5 | 8–10 |
| Horse chestnuts | 7– 8 | 14–17 |

\* Vol. per cent.
\*\* Per cent. of fresh weight
\*\*\* Ferments also under following conditions, with same percentage yield of acetone and alcohol:
*Media.*—Water, 1 liter; Potassium phosphate, 1 gram; ammonium phosphate, 1 gram; sodium chlorid, trace; calcium carbonate, 2–5 grams; galatose or levulose, 10 grams. Fermented at 40° C., in Gruber's anaerobic tubes—fermentation complete in 6–7 days.
Dextrose, levulose, galactose, cane sugar (sucrose), maltose, lactose, starch, d-arabinose also ferment with the above solution in a flask of such size that the liquid forms a shallow layer on the bottom.

The following are examples of specific operations:

I. A mash was prepared, consisting of 5 kilograms of corn, 5/10 kilogram of autolyzed yeast, 5/10 kilogram calcium carbonate and 100 kilograms of water. The mash was sterilized by heating under 15 lbs. steam pressure (about 115° C.) for about four hours. The mash was then put into a sterilized tank filled with chipped marble and inoculated with a pure culture of the above-described bacillus. After four days, analysis of a sample of the material showed the presence of acetone to the extent of 9% of the dry weight of the corn. The fermented material was then drawn off from the tank and a fresh mash, prepared like the first, was put into it and automatically inoculated with the bacilli remaining from the previous run. The fermentation was completed in about 40 hours and the yield of acetone was approximately the same as in the first run after four days. This operation was then repeated several times. In each case the acetone and alcohol were recovered by distillation. The yield of the acetone in the several runs varied between 8% and 10% of the dry weight of the corn and the yield of ethyl alcohol varied between 12% and 20% of the dry weight of the corn.

II. A mixture was prepared, consisting of molasses diluted with water so as to contain 8% of sugar. The mixture was sterilized by heating under 15 lbs. steam pressure (about 115° C.) for about four hours. The mixture was then put into a sterilized tank filled with chipped marble and inoculated with a pure culture of the above-described bacillus. After four days, analysis of a sample of the material showed the presence of acetone to the extent of 9% of sugar content. The fermented material was then drawn off from the tank and a fresh mixture, prepared like the first, was put into it and automatically inoculated with the bacilli remaining from the previous run. The fermentation was completed in about 40 hours and the yield of acetone was approximately the same as in the first run after four days. This operation was then repeated several times. In each case the acetone and alcohol were recovered by distillation. The yield of the acetone in the several runs varied between 8% and 10% of sugar content and the yield of ethyl alcohol varied between 12% and 20% of the sugar content.

In treating molasses the addition of nitrogenous material to the mixture is usually unnecessary, because the molasses contains sufficient nitrogenous material to permit the growth of the bacilli. This is also true in the treatment of other carbohydrate materials which contain nitrogenous matter in sufficient quantities.

Again, treating molasses, if marble chips are used as inert masses in the closed vessel, it is not necessary to add buffer material to the mixture prior to putting it into the closed vessel.

In carrying out the process, care should of course be taken to avoid contaminating the mash or mixture with inoculations of other bacilli or organisms after sterilization.

It is obvious that various changes may be made in the details of my processes without departing from the spirit and scope of my invention.

What I claim is:

1. The process of producing acetone, which comprises fermenting carbohydrate material with the herein-described bacillus aceto-ethylicum.

2. The process of producing acetone, which comprises fermenting material containing carbohydrate in the presence of nitrogenous material, with the herein-described bacillus aceto-ethylicum.

3. The process of producing acetone, which comprises fermenting material containing carbohydrates in the presence of a nitrogenous material and a buffer substance, with the herein-described bacillus aceto-ethylicum.

4. The process of producing acetone, which comprises preparing a mixture of carbohydrate material and water, containing also some nitrogenous material and some buffer substance, sterilizing the mixture, inoculating the mixture with the herein-described bacillus aceto-ethylicum, and permitting the mixture to ferment by the action of said bacillus.

5. The process of producing acetone, which comprises preparing a mixture of carbohydrate material and water, containing also some nitrogenous material and some buffer substance, sterilizing the mixture, putting the mixture in a closed vessel, inoculating the mixture with the herein-described bacillus aceto-ethylicum, and permitting the mixture to ferment by the action of said bacillus.

6. The process of producing acetone, which comprises preparing a mixture of carbohydrate material and water, containing also some nitrogenous material and some buffer substance, sterilizing the mixture, putting the mixture in a closed vessel containing masses of inert material, inoculating the mixture with the herein-described bacillus aceto-ethylicum, and permitting the mixture to ferment by the action of said bacillus.

7. The process of producing acetone, which comprises fermenting molasses with the herein-described bacillus aceto-ethylicum.

8. The process of producing acetone, which comprises fermenting molasses in the presence of a buffer substance with the herein-described bacillus aceto-ethylicum.

9. The process of producing acetone, which comprises preparing a mixture of molasses and water, adding some buffer substance, sterilizing the mixture, inoculating the mixture with the herein-described bacillus aceto-ethylicum, and permitting the mixture to ferment by the action of said bacillus.

10. The process of producing acetone, which comprises preparing a mixture of molasses and water, adding some buffer substance, sterilizing the mixture putting the mixture in a closed vessel, inoculating the mixture with the herein-described bacillus acto-ethylicum, and permitting the mixture to ferment by the action of said bacillus.

11. The process of producing acetone, which comprises preparing a mixture of molasses and water, adding some buffer substance, sterilizing the mixture, putting the mixture in a closed vessel containing masses of inert material, inoculating the mixture with the herein-described bacillus aceto-ethylicum, and permitting the mixture to ferment by the action of the said bacillus.

12. The process of producing acetone, which comprises preparing a mixture of carbohydrate material and water, containing also some nitrogenous material and some buffer substance, sterilizing the mixture, putting the mixture in a closed vessel, inoculating the mixture with the herein-described bacillus aceto-ethylicum, permitting the mixture to ferment by the action of said bacillus, withdrawing the fermented material from the vessel, and putting into the vessel a similarly prepared fresh mixture and permitting it to ferment.

13. The process of producing acetone, which comprises preparing a mixture of carbohydrate material and water, containing also some nitrogenous material and some buffer substance, sterilizing the mixture, putting the mixture in a closed vessel containing masses of inert material, inoculating the mixture with the herein-described bacillus aceto-ethylicum, permitting the mixture to ferment by the action of said bacillus, withdrawing the fermented material from the vessel, and putting into the vessel a similarly prepared fresh mixture and permitting it to ferment.

14. The process of producing acetone, which comprises preparing a mixture of molasses and water, adding some buffer substance, sterilizing the mixture, inoculating the mixture with the herein-described bacillus aceto-ethylicum, permitting the mixture to ferment by the action of said bacillus, withdrawing the fermented material from the vessel, and putting into the vessel a similarly prepared fresh mixture and permitting it to ferment.

15. The process of producing acetone, which comprises preparing a mixture of molasses and water, adding some buffer substance, sterilizing the mixture, putting the mixture in a closed vessel, inoculating the mixture with the herein-described bacillus aceto-ethylicum, permitting the mixture to ferment by the action of said bacillus, withdrawing the fermented material from the vessel, and putting into the vessel a similarly prepared fresh mixture and permitting it to ferment.

JOHN H. NORTHROP.